J. RANKIN.
Churn.
No. 47,129.
Patented April 4, 1865.
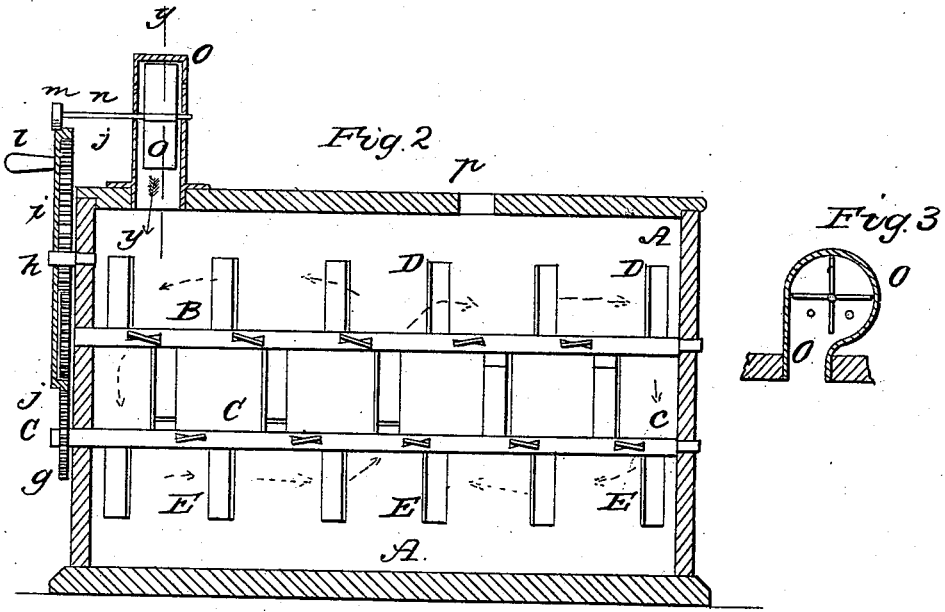
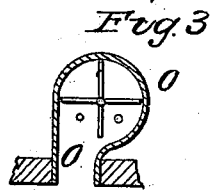
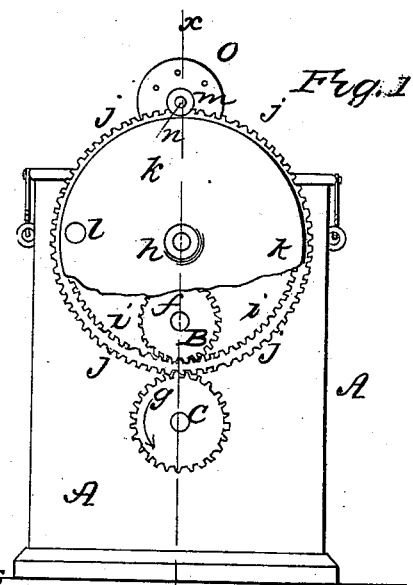
Witnesses
Inventor
John Rankin
By his attorney

UNITED STATES PATENT OFFICE.

JOHN RANKIN, OF NEW YORK, N. Y.

IMPROVED CHURN.

Specification forming part of Letters Patent No. 47,129, dated April 4, 1865.

*To all whom it may concern:*

Be it known that I, JNO. RANKIN, of New York, of the county of New York, in the State of New York, have invented certain new and useful Improvements in Churns; and I do hereby declare that the following is a full and exact description thereof, reference being had to the accompanying drawings, making part of this application.

My invention relates to certain improvements in churns, having for its object the production of a churn which shall be simple and economic in its construction, and which will at the same time be capable of producing butter more rapidly and with greater facility than any churn heretofore used.

To these ends my invention consists in the employment of a blower for forcing a current or blast of air down into and among the mass of cream, in connection with a series of dashers so arranged and operated as to thoroughly agitate the cream, and also create a current or circulation, as will be presently more fully described.

My invention further consists in the employment of two screw-dashers, arranged one above the other and so constructed and operating as to carry the cream in currents in given directions, as will be hereinafter more fully described.

My invention further consists in the employment of a main driving-wheel having formed on it an external and internal (a rim) gear in combination with the two driving-pinions of the dasher-shafts, and a friction-rim and friction-wheel for driving the blower, the whole arranged and operating substantially as hereinafter explained.

To enable those skilled in the art to make and use my invention, I will proceed to describe the construction and operation of one of my new churns, referring by letters to the accompanying drawings, in which—

Figure 1 is an end elevation; Fig. 2, a vertical longitudinal section at the line *x x* of Fig. 1; and Fig. 3 a detail sectional view of the blower, taken at the line *y y*, Fig. 2.

In the several figures the same letter of reference indicates the same part of the machine.

A is the box or body of the churn, which I prefer to make in an oblong or rectangular form and which is provided with a removable top or lid. Within the box A are arranged two longitudinally-placed shafts, B and C. These shafts are hung in suitable bearings in the ends of the box A. They run parallel with each other and in the same vertical plane, and are provided with paddles D and E, (or beaters,) arranged in helical curves, as will be presently explained. The adjacent ends of the shafts B C are provided, as shown, with two pinions, *f* and *g*, which mesh, respectively, into an internal rim-gear, *i*, and an external gear, *j*, (see Fig. 1,) which gears are formed on a disk, *k*, which is hung to turn or rotate freely on a stud, *h*, projecting from the churn-box, is provided with a suitable handle, *l*, and constitutes (with the gears *i* and *j*) the main driving-wheel of the machine. O is a small fan-blower, arranged on the top or lid of the churn, near one end. This blower is driven through the medium of its shaft *n* and friction pulley *m* by a friction surface or rim on the disk *k*. (See Fig. 2.) This blower communicates with the interior of the churn through a hole formed in the top or lid, as clearly seen at Fig. 2, and forces a continuous blast of air down into the churn-box. The top or lid should have a suitable hole or aperture, *p*, for the escape of the air forced into the churn by the blower O. The beaters D of the upper shaft, B, are so formed and arranged on said shaft as to constitute a right-and-left-hand screw running from the middle of the shaft toward either end, or, in other words, said beaters are arranged so as to form two helical curves, starting from the same point at the middle of the shaft and running toward each end, so that the tendency of said beaters D (when shaft B is rotated in a given direction) is to force the contents of the churn-box from the center toward each end of the box. The beaters E of the lower shaft, C, are arranged in helical curves just the reverse of those of the upper shaft—that is, so as to feed the contents of the churn from each end toward the center.

It will be readily understood that by this arrangement of the beaters D and E on the two shafts, one over the other, as explained, the cream in the box A will not only be very thoroughly agitated, but it will be also thrown into a state of rapid circulation in the directions indicated by the red arrows in drawings, and it will be seen that by this creation of a circulation, as explained, by the rapid rotation of the dashers, the blast of air will naturally follow in the direction of the currents of the mass of cream, and that thus the blast will be most thoroughly intermingled with the cream, and be brought into contact with each and every particle of the latter during its agitation.

By the formation of the main driving-gear and friction-rim and the arrangement therewith of the pinions $f$ and $g$ (of the proper comparative diameters) and friction-pulley $m$, it will be seen that a very compact, simple, and effective system of driving machinery is afforded for producing the proper rotation of the two dasher-shafts and also of the blower-shaft.

Of course the design or form of the blower is immaterial, and may be varied without departing from the spirit of my invention, so long as a blower is employed to supply the blast of air, substantially as described.

The two things essential in the process of rapidly producing good butter are, first, a thoroughly agitation and concussion of the mass, to break or rupture the globules or sacks which contain the particles of butter; and secondly, an ample supply of and dissemination through the agitated mass of atmospheric air to reduce the temperature of the cream heated by the friction of its particles against the beaters and each other; and it will be seen that by the arrangement of the blower, as described, with the peculiarly-constructed dashers operating, as set forth, to produce the circuit of currents and induce to the contact of each and every particle of butter with the currents of fresh air, this desirable end is attained to a great extent.

It is obvious that the forms of the screw-dashers and the directions of the currents produced by their rotation may be varied without losing the advantages of this feature of my invention, and, though I have shown (and deem best) the peculiar forms of dashers presented in the subject-matter of this application, other forms of feeding or screw dashers may be employed in connection with the blast to create the proper circulation and agitation without departing from my invention.

Having fully described my invention, what I claim as new, and desire to secure by Letters Patent, is—

1. The use or employment of a blower for forcing a blast of air into the churn box, substantially as described, in combination with two screw-dashers arranged one above the other, and so as to create a circulation of the cream, all as and for the purposes set forth hereinbefore.

2. The employment in combination of two screw-dashers one above the other, when one feeds from the middle toward each end and the other feeds from each end toward the middle.

3. The employment of the internal and external gears, $j$ $i$, and pinions $f$ $g$, in combination with the friction-rim disk $k$ and friction-pulley $m$ of the blower-shaft, the whole arranged and operating as specified.

In testimony whereof I have hereunto set my hand.

JNO. RANKIN.

In presence of—
J. M. McINTIRE,
CHARLES SPEER.